US012684661B2

(12) United States Patent
Sokovets et al.

(10) Patent No.: US 12,684,661 B2
(45) Date of Patent: Jul. 14, 2026

(54) COOLING SYSTEM FOR A COOKING OVEN

(71) Applicant: ELECTROLUX APPLIANCES AKTIEBOLAG, Stockholm (SE)

(72) Inventors: Dmytro Sokovets, Rothenburg ob der Tauber (DE); Cedric Catalogne, Porcia (IT); Trevor Specht, Rothenburg ob der Tauber (DE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 1451 days.

(21) Appl. No.: 17/266,745

(22) PCT Filed: Aug. 6, 2019

(86) PCT No.: PCT/EP2019/071136
§ 371 (c)(1),
(2) Date: Feb. 8, 2021

(87) PCT Pub. No.: WO2020/030650
PCT Pub. Date: Feb. 13, 2020

(65) Prior Publication Data

US 2021/0315070 A1 Oct. 7, 2021

(30) Foreign Application Priority Data

Aug. 10, 2018 (EP) .................................... 18188391

(51) Int. Cl.
*H05B 6/64* (2006.01)
*F24C 15/00* (2006.01)

(52) U.S. Cl.
CPC ........... *H05B 6/642* (2013.01); *F24C 15/006* (2013.01)

(58) Field of Classification Search
CPC .............................. F24C 15/006; H05B 6/642
(Continued)

(56) References Cited

U.S. PATENT DOCUMENTS

2002/0084266 A1* 7/2002 Ahn ....................... H05B 6/642 219/757
2012/0152937 A1* 6/2012 Nordh ...................... H05B 6/68 219/702
2019/0301746 A1* 10/2019 Catalogne .............. F24C 15/32

FOREIGN PATENT DOCUMENTS

EP 0615097 9/1994
EP 615097 A1 * 9/1994 ............ F24C 15/006
(Continued)

OTHER PUBLICATIONS

International Search Report and Written Opinion for PCT/EP2019/071136, dated Oct. 4, 2019, 11 pages.

*Primary Examiner* — Steven W Crabb
*Assistant Examiner* — Dilnessa B Belay
(74) *Attorney, Agent, or Firm* — Chrisman Gallo Tochtrop LLC

(57) ABSTRACT

The present invention relates to a cooling system for a cooking oven (10). The cooling system is arranged or arrangeable at an outer side of an oven cavity (12) of the cooking oven (10). The cooling system comprises a cooling fan (24), a blowing air channel (18) and a suction air channel (19). An outlet of the cooling fan (24) is connected to the blowing air channel (18). An inlet (26) of the cooling fan (24) is subdivided into a first inlet portion (32) and a second inlet portion (34). The first inlet portion (32) is either open or connected to an outlet (30) of a magnetron duct (20), while the second inlet portion (34) is permanently open. A further inlet (38) of the cooling fan (24) is connected to the suction air channel (19).

19 Claims, 12 Drawing Sheets

Figure 1:
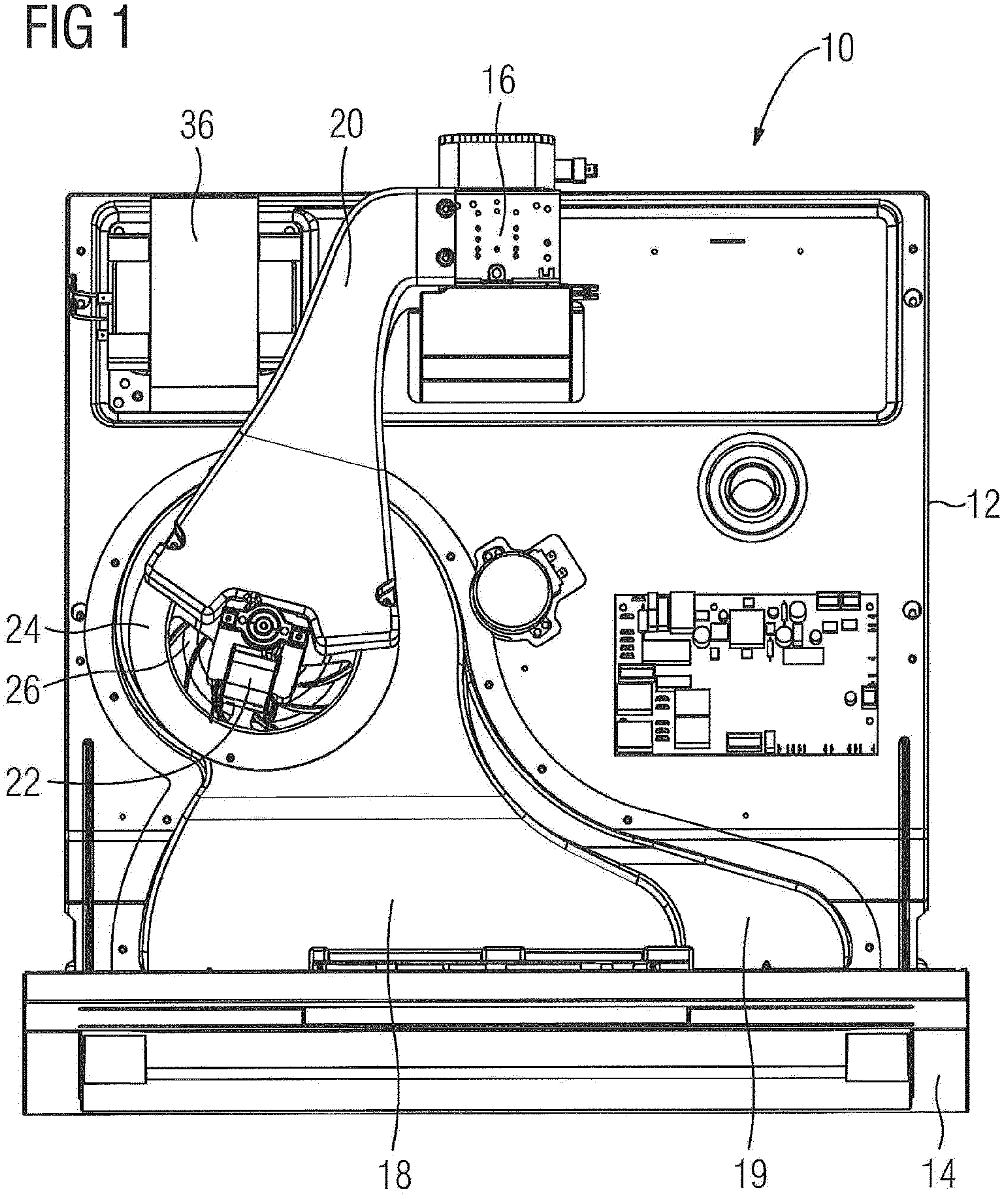

(58) Field of Classification Search
USPC .......................................................... 219/679
See application file for complete search history.

(56) References Cited

FOREIGN PATENT DOCUMENTS

| | | | | |
|---|---|---|---|---|
| EP | 1050718 | | 11/2000 | |
| EP | 1050718 | A2 * | 11/2000 | .......... F24C 15/2007 |
| EP | 1220576 | | 7/2002 | |
| EP | 3290808 | | 3/2018 | |

* cited by examiner

COOLING SYSTEM FOR A COOKING OVEN

The present invention relates to a cooling system for a cooking oven. Further, the present invention relates to a cooking oven with a microwave heating function, a steam cooking function and/or a pyrolytic cleaning function.

Today there are cooking ovens having different functions, for example a microwave heating function, a steam cooking function and/or a pyrolytic cleaning function. For each function special components are required. Further, most of said components must be cooled down.

For example, a magnetron for the microwave heating function requires an active cooling with a specific flow rate. Therefore, a cooling fan blows an air stream directly or via a duct to the magnetron.

Further, in a cooking oven with pyrolytic cleaning function the housing, the oven door and the electronic circuits are usually kept cool by a double-channel cooling system for safety and functionality reasons. For example, said double-channel cooling system is driven by a double-inlet centrifugal fan. The one inlet is connected to a suction channel extending to the oven door and cavity exhaust, wherein sucked air keeps the oven door cool on the one hand and evacuates moist air from the cavity on the other hand. The other inlet is open, wherein air from the space around the component carrier is sucked for cooling the housing and electronic elements. The outlet of the centrifugal fan is connected to a blowing channel through which the air is blown out of the cooling system.

A cooking oven with microwave heating function and pyrolytic cleaning function comprises usually two cooling fans. The one cooling fan is provided for cooling the magnetron, while the other cooling fan drives the double-channel cooling system for cooling the oven door, the housing and the electronic elements. However, this concept is complex and expensive, since two cooling fans are required.

It is an object of the present invention to provide a cooling system for a cooking oven, which allows the cooling of components for different functions by low complexity and costs.

According to the present invention a cooling system for a cooking oven is provided, wherein:

- the cooling system is arranged or arrangeable at an outer side of an oven cavity of the cooking oven,
- the cooling system comprises a cooling fan,
- the cooling system comprises a blowing air channel,
- the cooling system comprises a suction air channel,
- an outlet of the cooling fan is connected to the blowing air channel,
- an inlet of the cooling fan is subdivided into a first inlet portion and a second inlet portion,
- the first inlet portion is either open or connected to an outlet of a magnetron air duct, while
- the second inlet portion is permanently open, and
- a further inlet of the cooling fan is connected to the suction air channel.

The main idea of the present invention is the subdivided inlet of the cooling fan. The first inlet portion can suck air either from the space above or beside the oven cavity, e.g. for cooling down electronic components and the housing, or from the magnetron air duct, e.g. for cooling down the magnetron. In contrast, the second inlet portion always sucks air from the space above or beside the oven cavity for cooling down the electronic components and the housing. If the magnetron air duct is connected to the first inlet portion, then the space above or beside the oven cavity on the one hand and a magnetron connected to said magnetron air duct on the other hand are simultaneously cooled by only one cooling fan. This results in low complexity of the cooling system. In addition, an inverter power supply for the magnetron can be effectively cooled by arranging the inverter besides the magnetron in a region from where air is effectively sucked by the cooling fan into the magnetron via the magnetron air duct and the top fan inlet. Further, said cooling system is suitable for cooking ovens within and without microwave heating function. In the latter case, the same cooling system without the microwave duct may be used. This increases the usability of the cooling system and makes said cooling system modular.

For example, the cooling system is arranged above the oven cavity of the cooking oven. Alternatively, the cooling system is arranged at a side wall or in another portion of said oven cavity.

Preferably, the cooling fan is a double-inlet centrifugal fan. The one inlet of the fan is a sub-divided one as mentioned above. The further inlet is connected to the suction air channel connected to the cavity for evacuating moist air, i.e. cavity exhaust. Further, the further inlet is connected to air inlet slots in the front of the oven. Said air inlet slots may be opened or closed depending on if door cooling is required or not, respectively. For example, a cooking oven with pyrolytic function usually requires the door cooling. In this case, the air inlet slots in the front of the oven are opened and aligned with the openings in an oven door through which the air is sucked for cooling said oven door. If door ventilation is not required, then the air inlet slots are closed, and the suction air channel works purely for cavity exhaust.

Further, an outlet of the blowing air channel may be arranged at or connected to an outer space of the cooking oven.

For example, the outlet of the blowing air channel is arranged at the front side of the cooking oven.

The outlet of the blowing channel may be formed as a horizontal slot.

Preferably, the outlet of the blowing air channel is arranged above the oven door.

Further, an inlet of the magnetron air duct may be connected or connectable to a magnetron, wherein preferably said magnetron is arranged or arrangeable at the outer side of the oven cavity of the cooking oven.

Moreover, at least one air inlet slot of the suction air channel may be arranged in a front frame of the oven cavity.

Preferably, the at least one air inlet slot is aligned with a door outlet slot of the oven door in a closed state of said oven door.

According to the preferred embodiment, the inlet of the cooling fan subdivided into the first inlet portion and the second inlet portion is a top fan inlet arranged on the top of said cooling fan, while the further inlet of the cooling fan connected to the suction air channel is a bottom fan inlet arranged at the bottom of said cooling fan.

According to a preferred embodiment, the cooling system is arranged or arrangeable above the oven cavity of the cooking oven.

Alternatively, the cooling system may be arranged or arrangeable besides or beneath the oven cavity of the cooking oven.

Further, the present invention relates to a cooking oven with a microwave heating function, a steam cooking function and/or a pyrolytic cleaning function, wherein said cooking oven comprises the cooling system mentioned above.

At last, the cooking oven may include optionally the microwave heating function, wherein the magnetron and the magnetron duct are detachably arranged at said cooking oven. Two different embodiments of the cooking oven may be manufactured by low complexity and costs.

Novel and inventive features of the present invention are set forth in the appended claims.

Figure 2:
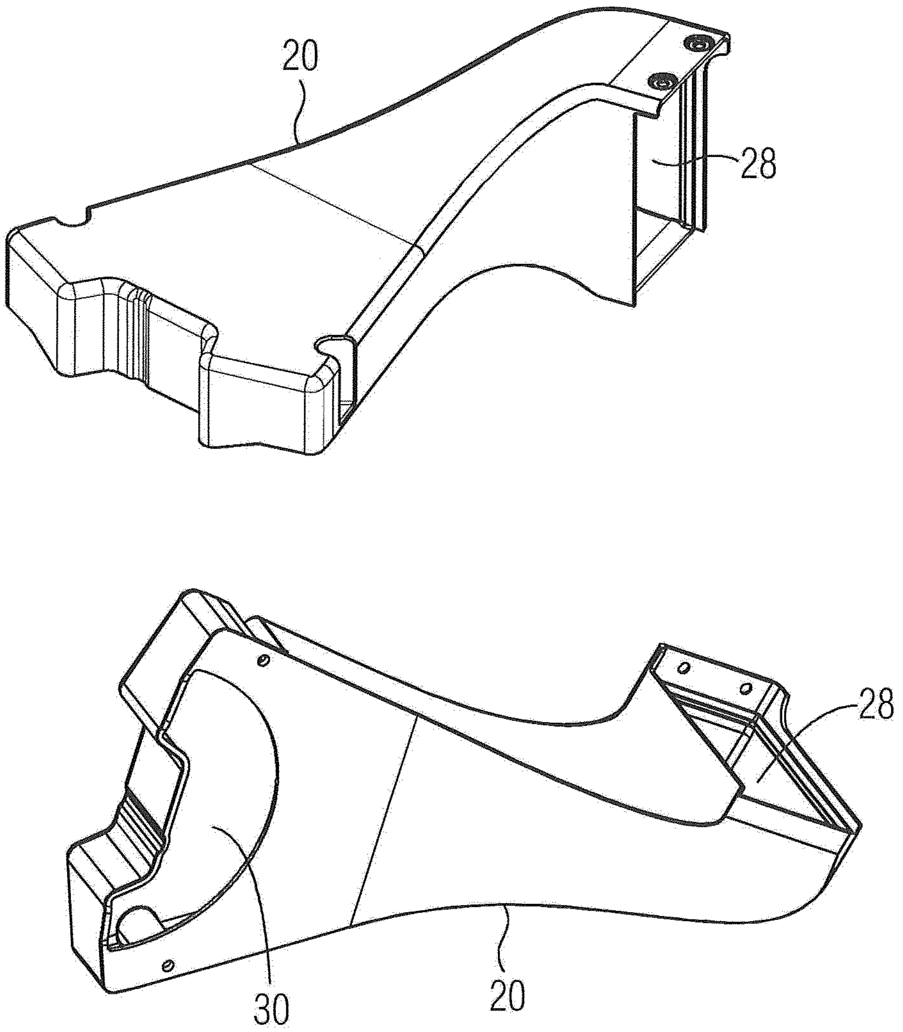
Figure 3:
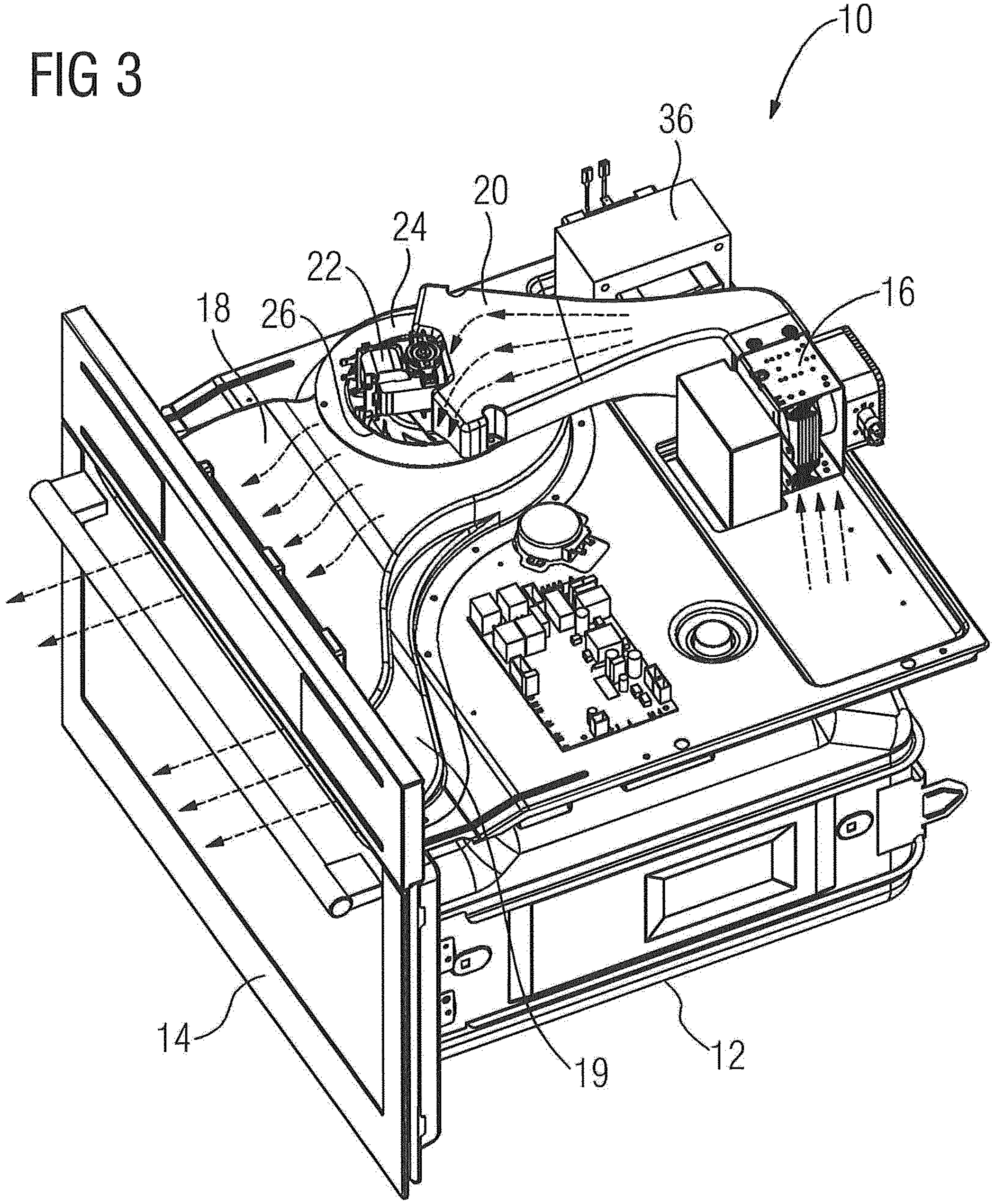
Figure 4:
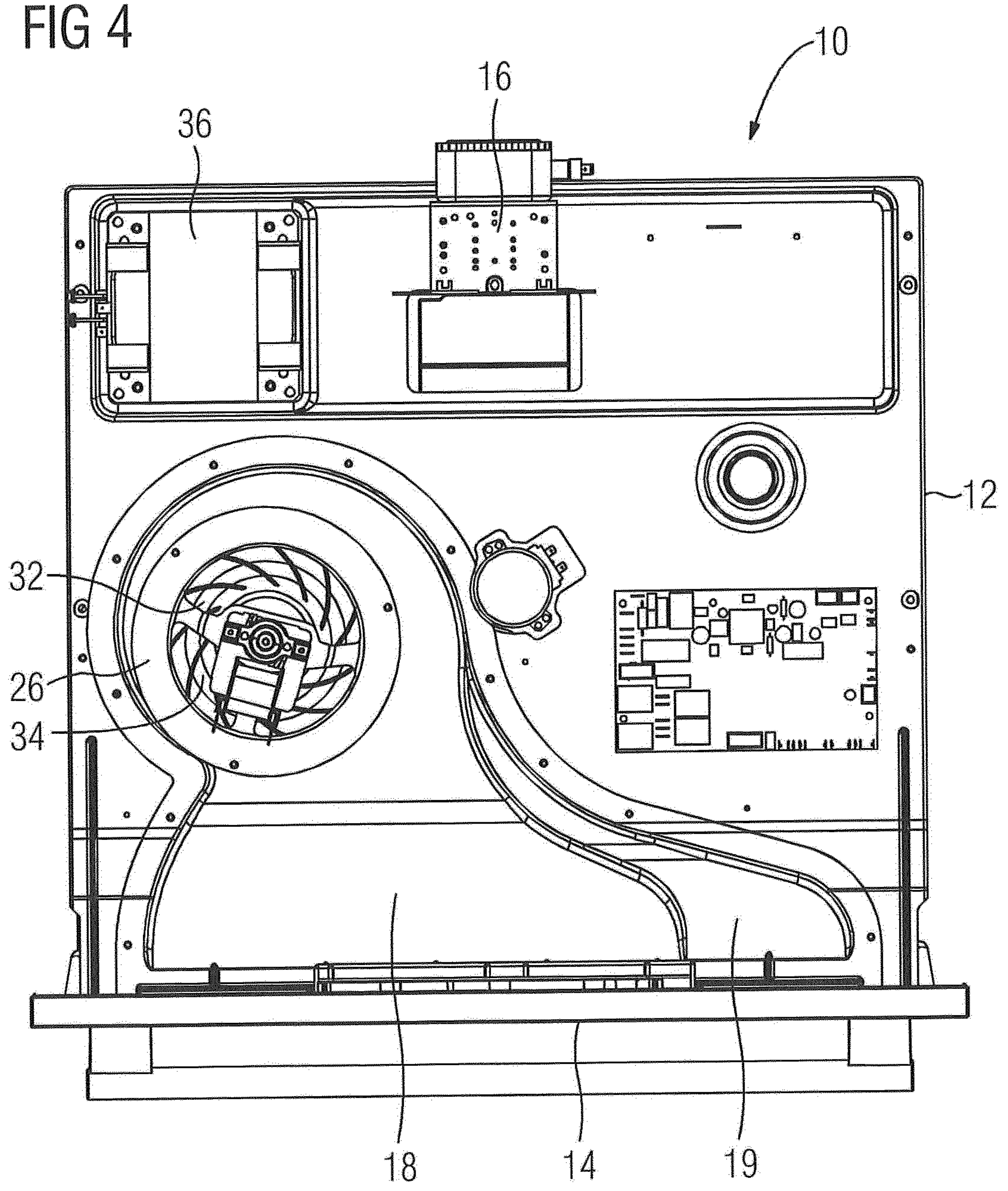
Figure 5:
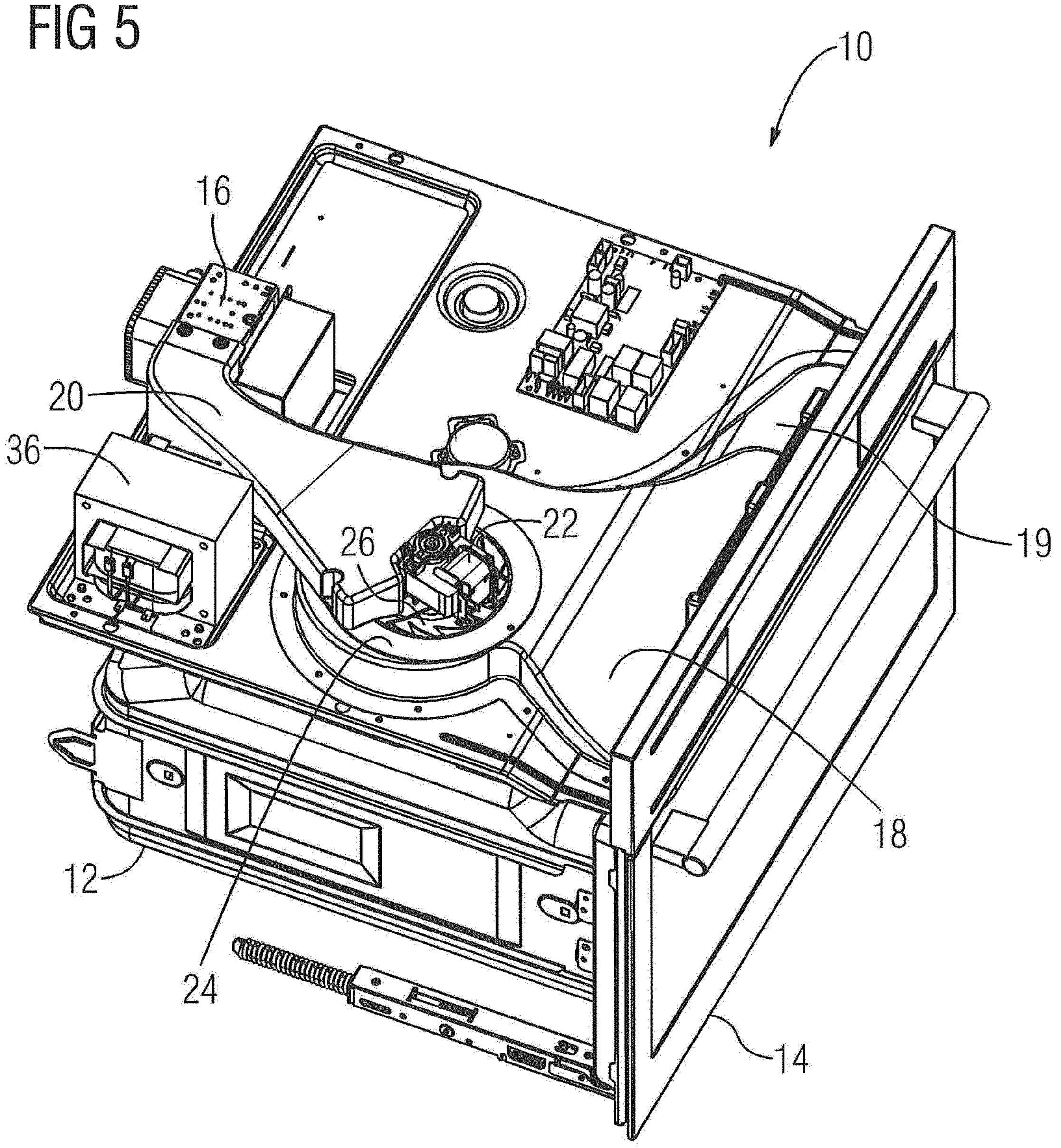
Figure 6:
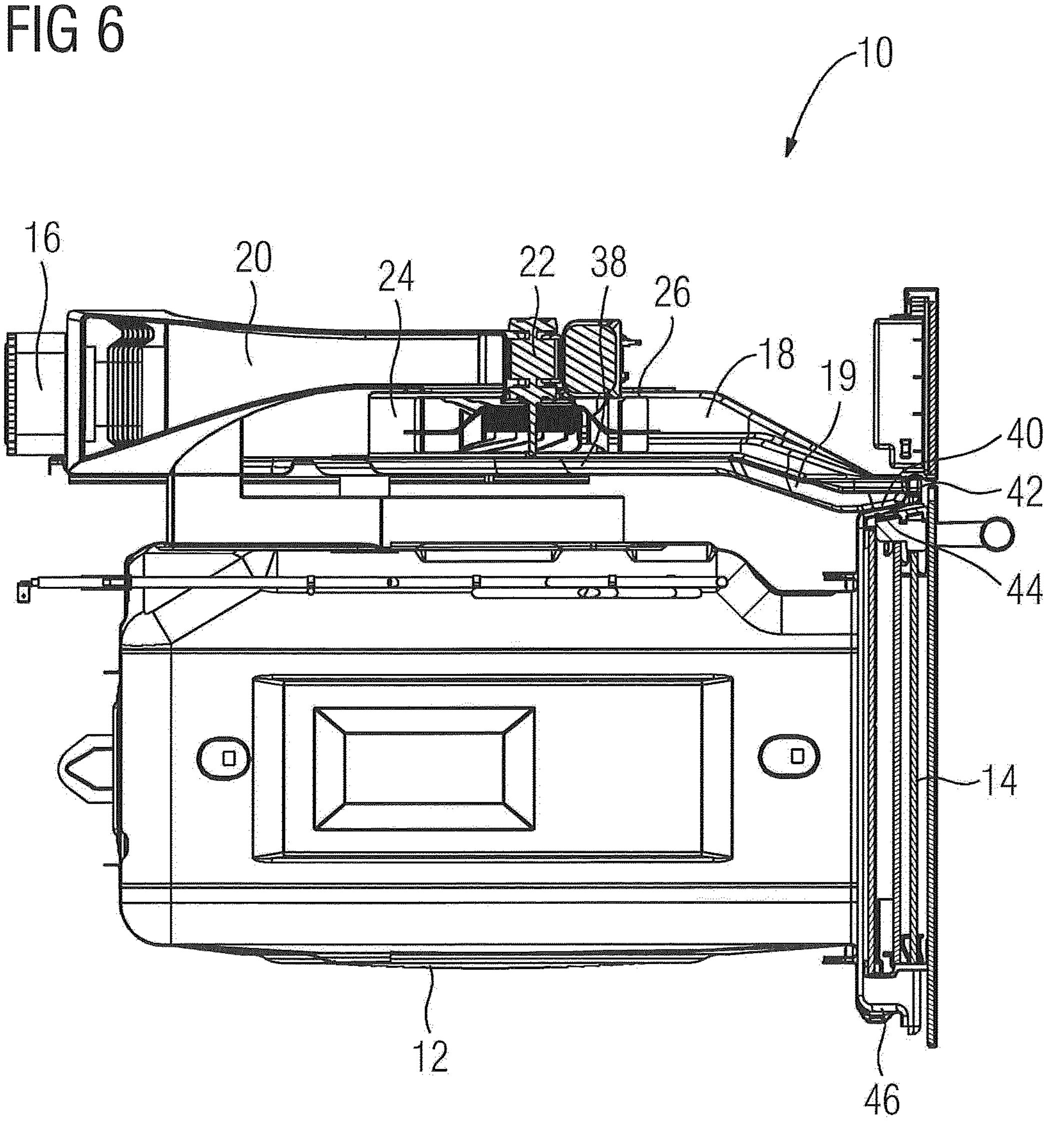
Figure 7:
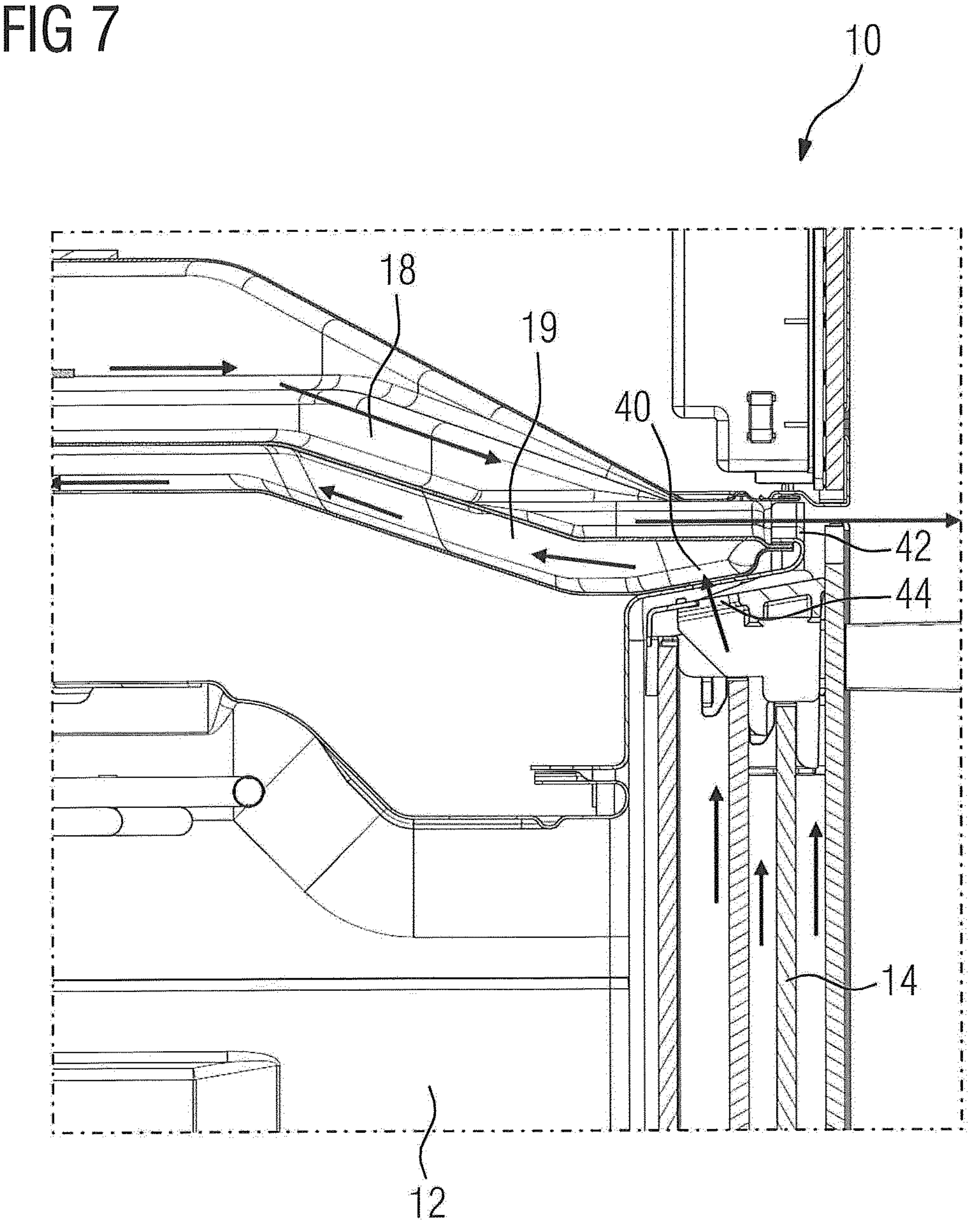
Figure 8:
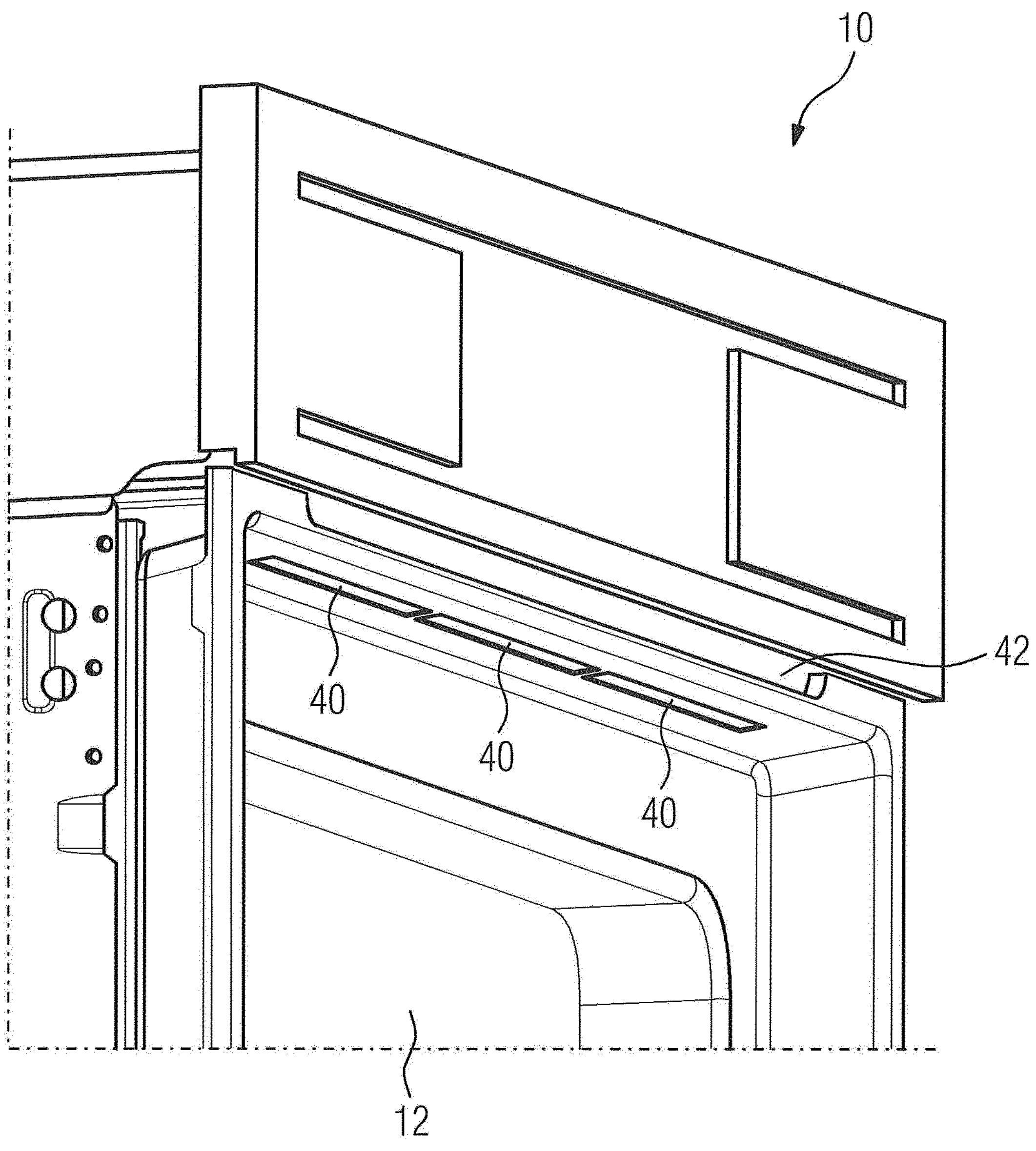
Figure 10:
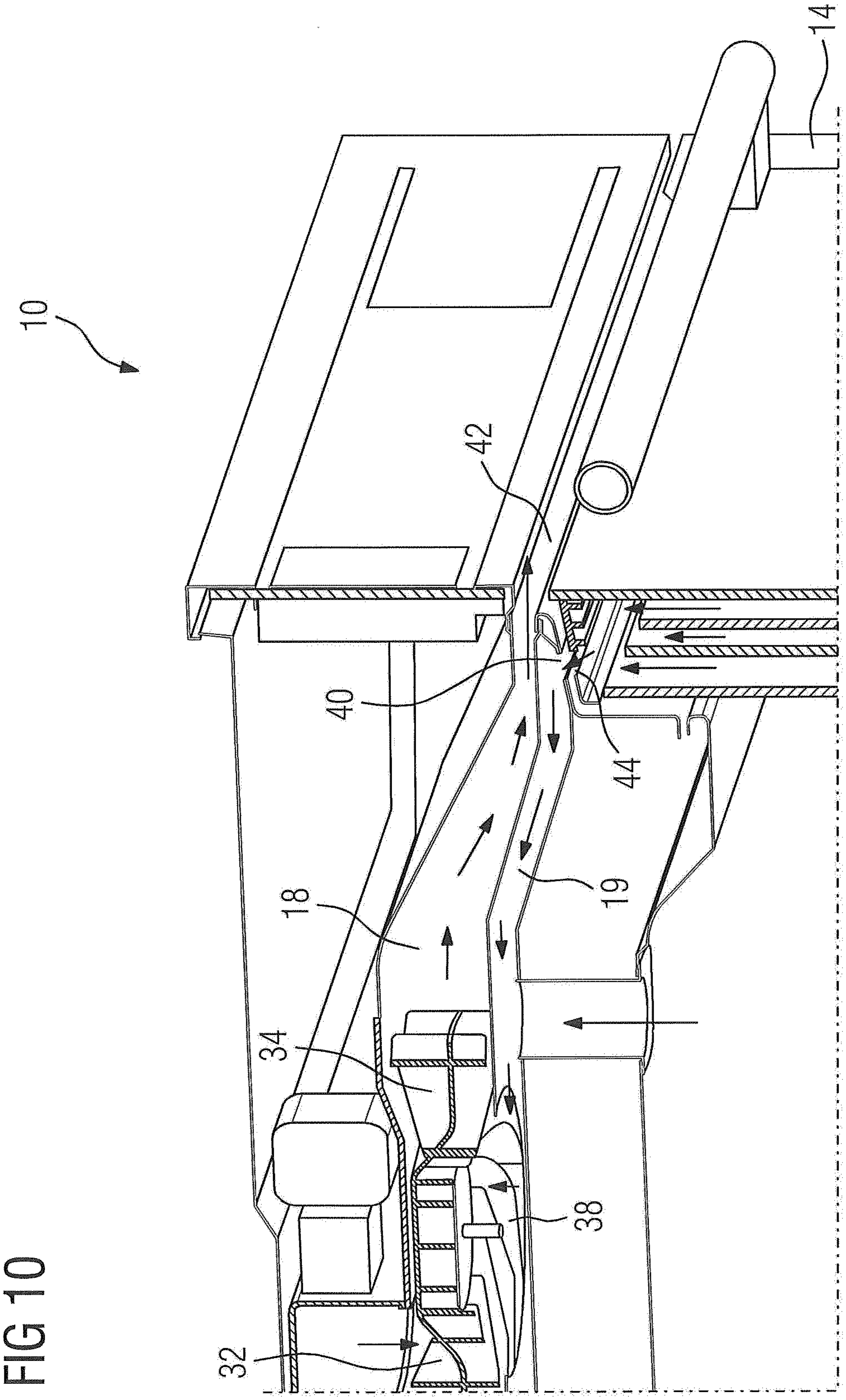
Figure 11:
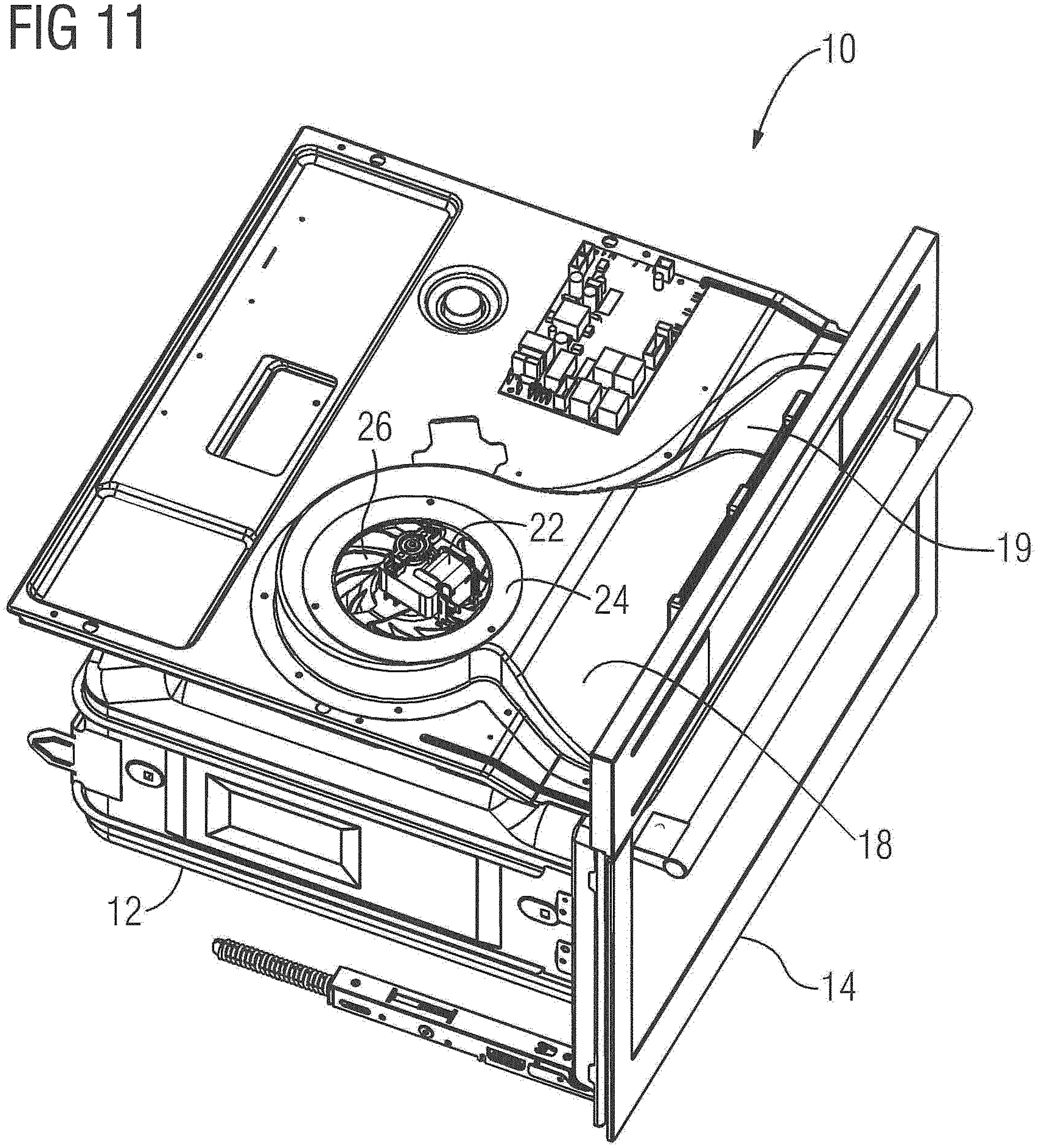
Figure 12:
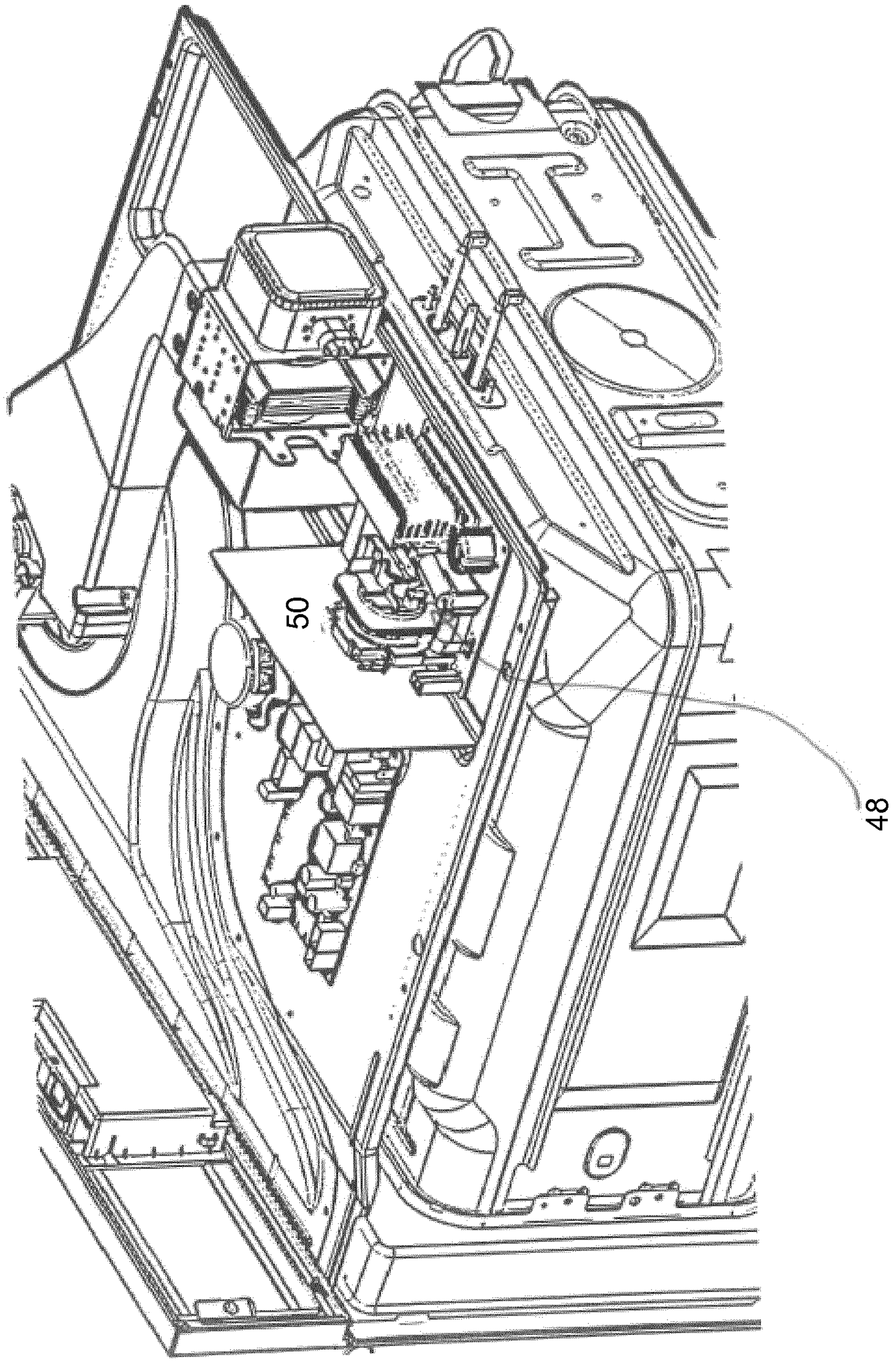

The present invention will be described in further detail with reference to the drawing, in which FIG. 1 illustrates a schematic perspective top view of a cooking oven with a cooling system according to a preferred embodiment of the present invention, FIG. 2 illustrates two perspective views of a magnetron duct 20 of the cooling system according to the preferred embodiment of the present invention, FIG. 3 illustrates a schematic perspective view of the cooking oven with the cooling system according to the preferred embodiment of the present invention, FIG. 4 illustrates a schematic top view of the cooking oven with the cooling system according to the preferred embodiment of the present invention, FIG. 5 illustrates a schematic perspective view of the cooking oven with the cooling system according to the preferred embodiment of the present invention, FIG. 6 illustrates a schematic sectional side view of the cooking oven with the cooling system according to the preferred embodiment of the present invention, FIG. 7 illustrates a schematic partial sectional side view of the cooking oven with the cooling system according to the preferred embodiment of the present invention, FIG. 8 illustrates a schematic partial perspective view of the cooking oven with the cooling system according to the preferred embodiment of the present invention, FIG. 8 illustrates a schematic perspective view of an oven door of the cooking oven with the cooling system according to the preferred embodiment of the present invention, FIG. 10 illustrates a schematic partial sectional perspective view of the cooking oven with the cooling system according to the preferred embodiment of the present invention, FIG. 11 illustrates a schematic perspective view of the cooking oven with the cooling system according to a first further embodiment of the present invention, and FIG. 12 illustrates a schematic perspective view of the cooking oven with the cooling system according to a second further embodiment of the present invention.

FIG. 1 illustrates a schematic perspective top view of a cooking oven 10 with a cooling system according to a preferred embodiment of the present invention.

The cooking oven 10 comprises an oven cavity 12, an oven door 14, a magnetron 16, a transformer 36 and the cooling system. The magnetron 16, the transformer 36 and the cooling system are arranged on the top of the oven cavity 12. The transformer 36 is provided for supplying the magnetron 16. The cooling system includes a blowing air channel 18, a suction air channel 19, a magnetron air duct 20, a motor 22 and a cooling fan 24. The cooling fan 24 is arranged within the blowing channel 18, wherein a top fan inlet 26 of said cooling fan 24 is formed in the top side of the blowing channel 18. The motor 22 is provided for driving the cooling fan 24. The suction air channel 19 is arranged beneath the blowing air channel 18.

In this example, the outlet of the blowing channel 18 is formed as a flat and wide horizontal slot. Thus, the height of the blowing channel 18 decreases from the top fan inlet 26 to the outlet, while the width of said blowing channel 18 increases from the top fan inlet 26 to the outlet. The magnetron duct 20 extends from the magnetron 16 to the top fan inlet 26.

FIG. 2 illustrates two perspective views of the magnetron air duct 20 of the cooling system according to the preferred embodiment of the present invention.

The magnetron air duct 20 is formed as a hollow part. The magnetron air duct 20 connects the top fan inlet 26 of the cooling fan 24 to the magnetron 16. Air is sucked through the magnetron 16 via the magnetron air duct 20 in order to cool down said magnetron 16.

For example, the magnetron air duct 20 is elongated, wherein an inlet 28 and an outlet 30 are arranged at its both ends, respectively. In this example, the inlet 28 and the outlet 30 are directed perpendicular to the longitudinal axis of the magnetron air duct 20, wherein the inlet 28 and the outlet 30 are directed perpendicular to each other.

FIG. 3 illustrates a schematic perspective view of the cooking oven 10 with the cooling system according to the preferred embodiment of the present invention.

The cooking oven 10 comprises the oven cavity 12 and the oven door 14. The magnetron 16, the transformer 36 and the cooling system are arranged on the top of the oven cavity 12. The blowing air channel 18 extends from the top fan inlet 26 to a front side of the cooking oven 10. The magnetron air duct 20 extends from the magnetron 16 to the top fan inlet 26.

Air from the magnetron 16 is sucked through the magnetron air duct 20 to the top fan inlet 26 by the cooling fan 24. Further, air from the space above the oven cavity 12 is sucked through the top fan inlet 26 and into the blowing channel 18 and blown through said blowing channel 18 to the area in front of the cooking oven 10 by the cooling fan 24. Thus, electronic elements and other components arranged above the oven cavity 12 are cooled by the cooling fan 24.

FIG. 4 illustrates a schematic top view of the cooking oven 10 with the cooling system according to the preferred embodiment of the present invention. For reasons of clarity, the magnetron duct 20 is not shown in FIG. 4.

The top fan inlet 26 of the cooling fan 24 is subdivided into a first inlet portion 32 and a second inlet portion 34. The first inlet portion 32 is connected to the outlet 30 of the magnetron air duct 20, while the second inlet portion 34 remains open. The air from the magnetron 16 is sucked through the magnetron air duct 20 and through the first inlet portion 32 into the blowing channel 18 by the cooling fan 24. The air from the space above the oven cavity 12 is sucked through the second inlet portion 34 into the blowing air channel 18 by the cooling fan 24 and then blown out through said blowing channel 18 to the area in front of the cooking oven 10.

FIG. 5 illustrates a schematic perspective view of the cooking oven 10 with the cooling system according to the preferred embodiment of the present invention. FIG. 5 clarifies that the first inlet portion 32 is covered by the magnetron air duct 20, while the second inlet portion 34 remains open. The first inlet portion 32 is connected to the outlet 30 of the magnetron air duct 20.

Preferably, the cooling system in FIG. 5 is suitable for a cooking oven with microwave heating function, steam cooking function and pyrolytic cleaning function.

FIG. 6 illustrates a schematic sectional side view of the cooking oven 10 with the cooling system according to the preferred embodiment of the present invention. FIG. 6 clarifies the arrangements of the blowing channel 18 and the magnetron air duct 20. The blowing channel 18 encloses the cooling fan 24, while the outlet 30 of the magnetron air duct 20 is arranged above the first inlet portion 32.

The air stream from the magnetron 16 flows horizontally through the magnetron air duct 20. Then, said air stream is sucked downwards through the outlet 30 of the magnetron air duct 20 and through the first inlet portion 32 by the cooling fan 24.

FIG. 7 illustrates a schematic partial sectional side view of the cooking oven 10 with the cooling system according to the preferred embodiment of the present invention.

FIG. 7 clarifies the arrangement of the blowing air channel 18 and the suction air channel 19. The suction air channel 19 is arranged beneath the blowing air channel 18. The blowing air channel 18 is interconnected between the cooling fan 24 and the air outlet slot 42 arranged above the oven door 14. The suction air channel 19 is connected between the cooling fan 24 and the air inlet slot 40. The air inlet slot 40 is aligned with a door outlet slot 44 of the oven door 14 in a closed state of said oven door 14. By this way, the suction air channel 19 is connected to the interior of the oven door 14 in order to cool down said oven door 14. In this example, the interior of the oven door 14 is subdivided into three vertical channels arranged between an outer panel, an inner panel and two intermediate panels. Further, the suction air channel 19 is connected to the oven cavity 12 in order to evacuate moist air, i.e. cavity exhaust.

FIG. 8 illustrates a schematic partial perspective view of the cooking oven 10 with the cooling system according to the preferred embodiment of the present invention.

FIG. 8 clarifies the arrangement of the air outlet slot 42 and the air inlet slot 40. The air outlet slot 42 is arranged above the oven door 14 and above the front opening of the oven cavity 12. The air inlet slot 40 is arranged in a front frame enclosing said front opening of the oven cavity 12. In this example, the air inlet slot 40 is subdivided into three serial slots. The suction air channel 19 is connected to the air inlet slot 40. The air inlet slot 40 may be opened or closed depending on if door cooling is needed or not, respectively.

Figure 9:
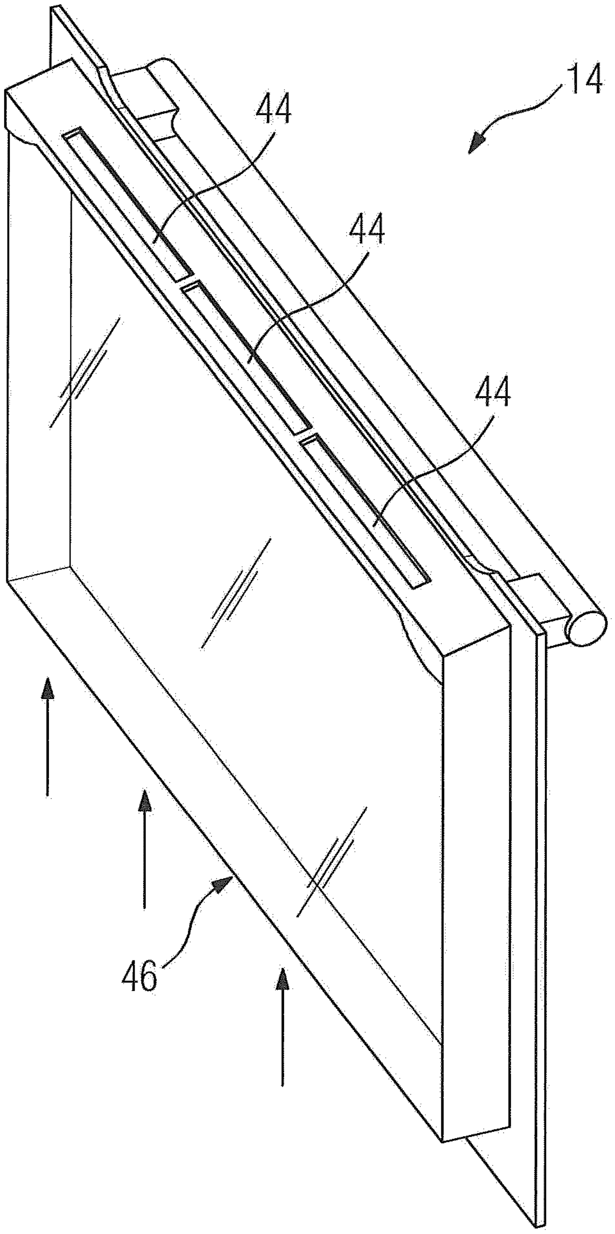

FIG. 9 illustrates a schematic perspective view of the oven door 14 for the cooking oven 10 with the cooling system according to the preferred embodiment of the present invention.

The door outlet slot 44 is arranged horizontally in the upper portion of the oven door 14. In this example, the door outlet slot 44 is subdivided into three serial slots. In contrast, the door inlet slot 46 is arranged horizontally in the lower portion of the oven door 14. The three cooling channels extend from the door inlet slot 46 to the door outlet slot 44. Said cooling channels extend between the outer door panel, the inner door panel and the both intermediate door panels arranged between said outer and inner door panels.

For example, a cooking oven with pyrolytic function usually requires a door cooling. In this case, the air inlet slots in the front of the oven are opened and aligned with the openings in the door through which the air is sucked to cool the door. If the door ventilation is not required, then the air inlet slots 40 are closed and the air suction channel works purely for cavity exhaust.

FIG. 10 illustrates a schematic partial sectional perspective view of the cooking oven 10 with the cooling system according to the preferred embodiment of the present invention.

In this example, the cooling fan 24 is a double-inlet centrifugal fan. The cooling fan 24 comprises the top fan inlet 26 and the bottom fan inlet 38. The top fan inlet 26 is sub-divided into the first inlet portion 32 and the second inlet portion 34. The first inlet portion 32 is connected to the magnetron air duct 20, while the second inlet portion 34 is open. The bottom fan inlet 38 is connected to the suction air channel 19. The suction air channel 19 is connected to the oven cavity 12 for evacuating moist air, i.e. cavity exhaust, on the one hand. On the other hand, the suction air channel 19 is connected to the interior of the oven door 14. In the closed state of the oven door 14, the door outlet slot 44 of said oven door 14 is aligned with the air inlet slot 40 of the suction air channel 19.

FIG. 11 illustrates a schematic perspective view of the cooking oven 10 with the cooling system according to a first further embodiment of the present invention.

The cooking oven 10 in FIG. 11 is substantially identical with the cooking oven 10 in FIGS. 1 to 10. However, the magnetron 16, the magnetron duct 20 and the transformer 36 lack in FIG. 11. The cooking oven 10 of the first further embodiment is provided without the microwave heating function. Thus, the present invention allows the provision of at least two different cooking ovens 10 by low complexity, wherein the one embodiment includes the microwave heating function, while the first further embodiment lacks the microwave heating function.

Particularly, the cooling system in FIG. 11 is suitable for a cooking oven with steam cooking function and pyrolytic cleaning function.

FIG. 12 illustrates a second further embodiment of the present invention in another schematic perspective view of the cooking oven 10.

The cooking oven 10 in FIG. 12 is again substantially identical with the cooking oven 10 in FIGS. 1 to 10. However, in FIG. 12 the transformer 36 is missing. In alternative to the transformer 36, in FIG. 12 the cooking oven 10 is provided with an inverter 48 power supply for the magnetron 16, such as is itself known in the prior art. The inverter 48 can be favourably adapted to use pulse-width modulation to provide effectively continuous heating, allowing food to be heated more evenly and quickly.

In FIG. 12 the inverter 48 is arranged besides the magnetron 16 in a region from where air is effectively sucked by the cooling fan 24 into the magnetron 16 and via the magnetron air duct 20 into the top fan inlet 26. The region where the inverter 48 is arranged in FIG. 12 is also shown in FIG. 3, however as an empty region. In FIG. 3 arrows in the corresponding region indicate the air stream that is sucked into the magnetron 16 and that is used for the cooling of the inverter 48 in FIG. 12.

In the embodiment of the invention shown in FIG. 12 the arrangement of the inverter 48 besides the magnetron 16 allows effective cooling of the inverter 48 by the air stream that is generated by the cooling fan 24. The air stream that cools the inverter 48 enters into the magnetron 16 and is led via the inlet 28 into the magnetron air duct 20 and into the top fan inlet 26. The embodiment shown in FIG. 12 does not require any air duct that directly connects the inverter 48 to the magnetron 16 for an effective cooling of the inverter 48. Rather, the inverter 48 can be placed without any direct connection to the magnetron 16 into the air stream that is sucked into the magnetron 16 by the cooling fan 24, wherein the cooling fan 24 is connected to the other side of the magnetron 16 via the inlet 28, the magnetron air duct 20 and the top fan inlet 26.

In a further preferred embodiment also shown in FIG. 12, an air guide 50 which is formed as a vertical wall can be arranged besides the inverter 48. The air guide 50 is oriented essentially in parallel to said air stream shown in FIG. 3 that enters into the magnetron 16. The air guide 50 increases the efficiency of the cooling of the inverter 48 by effectively directing the air stream that enters into the magnetron 16 over the inverter 48.

Thus, the present invention further allows the provision of a cooking oven 10 that comprises an inverter 48 instead of a transformer 36, wherein the inverter 48 is effectively cooled in addition to the magnetron 16 with low complexity. The inverter 48 is cooled by the air stream that cools already the magnetron 16 and that is generated by the cooling fan 24 and sucked through the magnetron 16 via the magnetron air duct 20 into the top fan inlet 26.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 cooking oven
12 oven cavity
14 oven door
16 magnetron
18 blowing air channel
19 suction air channel
20 magnetron air duct
22 motor
24 cooling fan
26 top fan inlet
28 inlet of the magnetron duct
30 outlet of the magnetron duct
32 first inlet portion
34 second inlet portion
36 transformer
38 bottom fan inlet
40 air inlet slot
42 air outlet slot
44 door outlet slot
46 door inlet slot
48 inverter
50 air guide

The invention claimed is:

1. A cooking oven comprising:
an oven cavity;
a magnetron;
a cooling system arranged at an outer side of the oven cavity, the cooling system comprising:
a cooling fan having a top fan inlet arranged on a top of said cooling fan, a further inlet, and an outlet,
a blowing air channel, the outlet of the cooling fan being connected to the blowing air channel,
a suction air channel connected to the further inlet of the cooling fan, and
a magnetron duct, wherein an inlet of the magnetron duct is connected to the magnetron, and is arranged at the outer side of the oven cavity of the cooking oven; and
an inverter power supply that is arranged besides the magnetron in a region from where air is effectively sucked by the cooling fan into the magnetron, wherein air is sucked from the magnetron via the magnetron duct into the top fan inlet of said cooling fan,
wherein the top fan inlet of the cooling fan is subdivided into a first inlet portion and a second inlet portion, the first inlet portion being connected to an outlet of the magnetron duct such that the first inlet portion is configured to deliver air from the magnetron duct to the cooling fan, the second inlet portion being permanently open to an outer space of the oven cavity such that the second inlet portion is configured to deliver air from the outer space to the cooling fan.

2. The cooking oven according to claim 1, wherein the cooling fan is a double-inlet centrifugal fan.

3. The cooking oven according to claim 1, wherein an outlet of the blowing air channel is arranged at or connected to the outer space of the cooking oven.

4. The cooking oven according to claim 3, wherein the outlet of the blowing air channel is arranged at a front side of the cooking oven.

5. The cooking oven according to claim 3, wherein the outlet of the blowing air channel is formed as a horizontal slot.

6. The cooking oven according to claim 3, wherein the outlet of the blowing air channel is arranged above and/or beside an oven door.

7. The cooking oven according to claim 1, wherein at least one air inlet slot of the suction air channel is arranged in a front frame of the oven cavity.

8. The cooking oven according to claim 1, wherein the further inlet of the cooling fan connected to the suction air channel is a bottom fan inlet arranged at a bottom of said cooling fan.

9. The cooking oven according to claim 1, wherein the cooling system is arranged above the oven cavity of the cooking oven.

10. The cooking oven according to claim 1, wherein the cooling system is arranged besides or beneath the oven cavity of the cooking oven.

11. The cooking oven according to claim 1, wherein the cooking oven includes a microwave heating function, a steam cooking function and/or a pyrolytic cleaning function.

12. The cooking oven according to claim 11, wherein the cooking oven includes the microwave heating function, and the magnetron and the magnetron duct are detachably arranged at said cooking oven.

13. The cooking oven according to claim 1, further comprising an air guide arranged besides the inverter power supply, said air guide comprising a vertical wall oriented parallel to a direction of air flowing into the magnetron.

14. A cooking oven comprising:
an oven cavity;
an oven door adapted to close the cooking cavity in a closed state thereof; and
a cooling system arranged at an outer side of the oven cavity, the cooling system comprising:
a cooling fan having an inlet, a further inlet, and an outlet,
a blowing air channel, the outlet of the cooling fan being connected to the blowing air channel,
a suction air channel connected to the further inlet of the cooling fan, the suction air channel having at least one air inlet slot arranged in a front frame of the oven cavity and aligned with a door outlet slot of the oven door in a closed state of said oven door, and
a magnetron duct,
wherein the inlet of the cooling fan is subdivided into a first inlet portion and a second inlet portion, the first inlet portion being connected to an outlet of the magnetron duct such that the first inlet portion is configured to deliver air from the magnetron duct to the cooling fan, the second inlet portion being permanently open to an outer space of the oven cavity such that the second inlet portion is configured to deliver air from the outer space to the cooling fan.

15. A cooling oven comprising:

an oven cavity;

a door adapted to close the cooking cavity in a closed state thereof;

a magnetron; and a cooling system located above the cooking cavity, the cooling system comprising:

a blower fan having a top fan inlet arranged on a top of said cooling fan, and a bottom fan inlet arranged on a bottom of said cooling fan, said top fan inlet being subdivided into a first inlet portion and a second inlet portion, a blowing air channel having an outlet located above said door in the closed state thereof, a suction air channel extending from a suction inlet to a suction outlet connected to said bottom inlet of said blower fan, and a magnetron air duct having a magnetron air inlet disposed adjacent to said magnetron and a magnetron air outlet connected to said first inlet portion of said top fan inlet, wherein the second inlet portion of said top fan inlet is open to a space above said oven cavity, and said blower fan is configured to discharge air sucked from said top and bottom fan inlets through said blowing air channel and out from the outlet of the blowing channel.

16. The cooking oven according to claim 15, said suction air channel further communicating with an interior of said oven cavity so that operation of said blower fan also evacuates air from said oven cavity.

17. The cooking oven according to claim 15, said blower fan being housed within said blower channel.

18. The cooking oven according to claim 15, wherein:

said suction inlet is disposed in a front frame of the cooking oven and aligned with an air outlet of said door in said closed state thereby providing fluid communication between a cooling channel of said door and said suction channel of said cooling system, said outlet of the blowing air channel is located at a front of said cooking oven, and operation of said blower fan simultaneously draws respective cooling air flows over said magnetron via said magnetron air duct, through said door via said cooling channel and said suction channel, and over at least one additional component located in said space above said oven cavity via said second inlet portion of said top fan inlet.

19. The cooking oven according to claim 15, wherein the suction air channel is arranged beneath the blowing air channel.

* * * * *